United States Patent [19]

Dröscher et al.

[11] Patent Number: 4,731,413

[45] Date of Patent: Mar. 15, 1988

[54] MOLDING COMPOSITIONS BASED ON LINEAR, HIGH-MOLECULAR WEIGHT POLYESTERS

[75] Inventors: Michael Dröscher, Dorsten; Christian Gerth, Haltern; Harald Sturm, Marl, all of Fed. Rep. of Germany

[73] Assignee: Huels Aktiengesellschaft, Marl, Fed. Rep. of Germany

[21] Appl. No.: 829,254

[22] Filed: Feb. 14, 1986

[30] Foreign Application Priority Data

Feb. 14, 1985 [DE] Fed. Rep. of Germany ....... 3504986

[51] Int. Cl.[4] ...................... C08L 67/02; C08L 13/02; C08L 21/02
[52] U.S. Cl. ........................................ 525/64; 525/92; 525/175; 525/176; 525/445
[58] Field of Search ................... 525/176, 445, 64, 92, 525/175

[56] References Cited

U.S. PATENT DOCUMENTS 3,742,093 6/1973 Skidmore ............................ 525/232
4,172,859 5/1975 Epstein ................................ 525/176

FOREIGN PATENT DOCUMENTS 0056123 12/1981 European Pat. Off. .
1124911 1/1966 United Kingdom .

*Primary Examiner*—Patricia A. Short
*Attorney, Agent, or Firm*—Millen & White

[57] ABSTRACT

Polyesters are modified by adding an aqueous latex having a solids content of <50% by weight. The synthetic resin contained in the latex has a glass transition temperature of $\leq 0°$ C. and contains 0.1–20 mol-% of functional groups.

21 Claims, No Drawings

MOLDING COMPOSITIONS BASED ON LINEAR, HIGH-MOLECULAR WEIGHT POLYESTERS

BACKGROUND OF THE INVENTION

This invention relates to molding compositions based on a linear, high-molecular weight polyester to which is admixed at least one additional synthetic resin, present as an aqueous latex, at an elevated temperature, under elevated pressure, and under the effect of strong shear forces.

The state of the art has included for a long time the practice of altering and improving the properties of a thermoplastic polymer by intimate admixture of an additional polymer (German Patent No. 1,260,135). Thus, DOS No. 2,622,876 describes molding compositions based on a polyester combined with 1–40 parts of a copolymer. The mixture of the components is effected in a closed system. This type of admixing permits only the use of copolymers which are introduced into the mixing unit in the solid phase, as powders, granules or crumbs. This procedure is unsuitable for incorporating into the polyester copolymers having a softening point below room temperature.

Such copolymers are normally produced as aqueous latices. It has been known to incorporate latices directly into thermoplastics by admixing the latex with the molten termoplastic (Adv. Polym. Techn. 3:41 et seq. [1983]; U.S. Pat. No. 3,742,093). The thus used thermoplastics had been obtained by polymerization exclusively. Resins obtained by polycondensation have not been described.

It is known from European Patent No. 56,123 to incorporate water-containing graft copolymers into saturated polyesters. However, the water content is restricted to at most 50% by weight. Since latices most contain more than 50% by weight of water, these must be processed and/or dehydrated for use in its method. Processing of the latices involves precipitation of the polymer, as well as partial removal of the water with the aid of mechanical methods. The significant drawback of this known process resides in having to work up the latex, instead of using it directly, without a previous treatment.

SUMMARY OF THE INVENTION

It is thus an object of this invention to avoid and/or ameliorate the above-discussed disadvantages of the prior art.

It is a further object of this invention to enable the direct use of a latex having a high water content as a modifying medium for polyesters.

Upon further study of the specification and appended claims, further objects and advantages of this invention will become apparent to those skilled in the art.

These objects have been attained, by using aqueous latices having a solids content of <50% by weight wherein the synthetic resin present in the latex is a homopolymer, copolymer, or a block copolymer having a glass transition temperature of ≦0° C., or a polymer of the core-shell type, wherein the monomers utilized for building the shell, polymerized by themselves, likewise have a glass transition temperature of ≦0° C. and wherein the synthetic resin present in the latex contains 0.1–20 mol-% of functional groups, based on the synthetic resin, i.e., 0.1–20% of its monomeric units contain functional groups.

DETAILED DISCUSSION

The aqueous latices contain, as the synthetic resins, homopolymers, copolymers, or block copolymers which can also be of the core-shell type. Their manufacture and chemical structures are conventional (see, e.g., German Patent No. 1,260,135; DAS No. 2,622,973; DOS Nos. 2,622,876; 3,245,292; European Provisional Publication No. 82 03 222; Houben-Weyl, "Methoden der organischen Chemie" [Methods of Organic Chemistry] XII.1:133–406 [1961]; F. Hoescher, "Dispersionen synth. Hochpolymerer" [Synthetic High Polymer Dispersions] I, Springer, Berlin [1969]; Encyclopedia of Polym. Sci. Technology, 8:164–195, Interscience Publishers, N.Y. [1968]; Poelein, G. W. et al., "Science and Technology of Polymer Colloids" I and II, Martinus Nijhoff Publishers, Den Haag [1983], which are incorporated by reference herein). The usual homo-, co-, block co- or shell forming polymers involved are based on monomers of styrene, acrylonitrile, conjugated dienes, such as butadiene, isoprene or chloroprene, unconjugated dienes, α-olefins, vinyl chloride, vinylidene fluoride, vinyl acetate, aliphatic esters of methacrylic acid of 1–20 carbon atoms in the alcohol component, or similar compounds. The relative proportions of comonomers are not critical as long as the other requirements of this invention are met. Thus, relative proportions of 0–100% of these monomers can be used to prepare the co- and homopolymers having a molecular weight of >50,000.

Most preferred polymers are obtained by polymerization of acrylic acid, ($C_4$–$C_6$) aliphatic esters of acrylic acid, butadiene-(1.4), styrene, α-olefines, maleic acid or aliphatic esters thereof.

An important feature of this invention is that the synthetic resin contains 0.1–20 mol-%, preferably 0.5–15 mol-%, of functional groups, based on the overall synthetic resin. Suitable non-limiting examples of functional groups include inter alia, carboxy, ester, amide, epoxy, amino or hydroxy groups or combinations thereof. Functional groups mean active groups, which are able to form ester- or amide-linkages with the polycondensation under reaction conditions.

Monomers yielding these functional groups include, for example, fumaric acid, maleic acid or its anhydride, acrylic acid, methacrylic acid, tert-butyl acrylate, hydroxyethyl acrylate, butanediol monoacrylate, fumaric acid or maleic acid mono- or dialkyl esters of 1–20, preferably 4–12 carbon atoms in the alkyl group.

The synthetic resin is a homopolymer, copolymer or block copolymer, which can also be of the core-shell type. According to the invention, they have a glass transition temperature of ≦0° C., preferably ≦20° C., e.g., −20 to ≦60° C. In the case of polymers of the core-shell type, this glass transition temperature refers to the properties of the shell polymers per se as they would be obtained by sole polymerization of the monomers forming the shell. The glass transition temperature and identity of the polymers forming the core are not critical; normally, its glass transition temperature is −80° to 140° C. (general range), preferably −60° to 0° C. (range for "soft/soft" types).

The latex used in this invention has a solids content of <50% by weight, preferably 20–48% by weight and especially 30–45% by weight. Suitable linear, high-molecular weight polyesters include all those that are conventional and customary, such as homopolyesters, copolyesters, block copolyesters—especially those based on terephthalic acid. (See, e.g., Sorensen and Campbell, Preparative Methods of Polymer Chemistry, Interscience Publishers, Inc., N.Y. [1961], pages 111-127; Kirk-Othmer, Encyclopedia of Chemical Technology, 18:549-574, John Wiley and Sons [1982]; U.S. Pat. Nos. 2,465,319; 3,047,539, which disclosures are incorporated by reference herein). "Linear" polyesters mean that the products are not crosslinked or branched.

Non-limiting examples of useful polyesters include polyethylene terephthlate, polypropylene terephthalate and, preferably, polybutylene terephthalate. However, many others can be used.

Up to 15 mol-% of terephthalic acid in these polyesters can be replaced by other conventional aromatic, cycloaliphatic or aliphatic dicarboxylic acids. Examples of suitable dicarboxylic acids include isophthalic acid, phthalic acid, cyclohexane-1,4-dicarboxylic acid, adipic acid, azelaic acid, decanedicarboxylic acid, or similar compounds. Up to 15 mol-% of the alkanediol in the polyester can be sustituted by other aliphatic or cycloaliphatic diols, such as, for example, ethylene glycol, 1,3-propanediol, 1,4-butanediol, 1,6-hexanediol, neopentyl glycol, 1,4-dimethylolcyclohexane, 1,12-dodecanediol, or similar compounds.

The polyester employed in the mixing process is produced conventionally by ester interchange or esterification and subsequent polycondensation of, e.g., terephthalic acid or its polyester-forming derivatives and, e.g., 1,4-butanediol in the presence of catalysts (Sorensen and Campbell, Preparative Methods of Polymer Chemistry, Interscience Publishers, Inc., N.Y. [1961], p. 111-127; "Kunststoff-Handbuch" [Plastics Manual] VIII, C. Hanser Publishers, Munich [1973]; and, respectively, Journal of Polymer Science, Part A 1 4:1851 to 1859 [1966], which disclosures are incorporated by reference herein).

The polyesters typically have a viscosity number (J) of 50 to 250, preferably 90 to 150 cc/g.

In the molding composition, the latex proportion—calculated as solid matter—is 1-400 parts by weight, based on 100 parts by weight of polyester. A proportion of 5-100 parts by weight of latex solids content is preferred; especially preferred is the range from 10 to 40 parts by weight.

For the production of the molding compositions of this invention, the polyester can first be melted in a mixing extruder or in a satellite extruder, or directly introduced into a mixing extruder from the polycondensation reactor. Other continuously conveying mixing units can also be utilized in place of the mixing extruder, permitting, besides a good mixing action, also an effective devolatilization of the melt. The latex typically is introduced into a second opening of the mixing unit by means of a suitable pump, for example a piston-diaphragm pump or a Mono pump.

The melt temperature of the polyesters is, during the mixing procedure, in the range from 150° to 300° C., preferably 200°-280° C. The temperature is preferably chosen so that it is 10°-70° C., preferably 15°-40° C., above the melting point of the polyester. Mixing takes place under a pressure of about 1 to 100 bar.

The term "strong shear forces" means that during the mixing procedure an agglomeration has to he avoided and a quite good dispersion of latex has to be effected in the matrix of polyester.

Separation of the entire aqueous phase is performed only after the latex has been incorporated into the polyester melt, e.g., through the mixing zones of the mixing extruder, by mechanical squeezing in subsequently arranged squeezing or compacting zones with separating openings, as well as by additional devolatilizing zones or openings of the same unit, or in a subsequently arranged devolatilizing extruder. This aspect is fully conventional.

The molding composition is, e.g., extruded into a rod, cooled, and granulated. The mixing step as such is fully conventional and not part of this invention. It is known from the state of the art (see, e.g., Adv. Polym. Techn. 3:41 et seq. [1983]; U.S. Pat. No. 3,742,093, which disclosures are incorporated by reference herein).

The molding compositions of this invention can be subjected to any conventional solid-phase recondensation method, as described, for example, in German Patent Nos. 3,033,468 and 3,033,469. The molding compositions of the invention can also contain polyesters obtained by mixing various polyesters and/or by mixing a polyester with polyamides or polycarbonates or with other thermoplastic polymers, such as, for example, polyethylene, polypropylene, polystyrene, polymethyl methacrylate, or copolymers thereof. Conventional additives and auxiliary agents such as pigments, processing aids, fillers and reinforcements, hydrolysis or UV stabilizers, can also be incorporated during the manufacture as well as into the finished molding compositions. These aspects (e.g., processing details, amounts, etc.) are fully conventional.

It is surprising that the molding composition, in spite of the large amount of water introduced into the polyester melt during production with the latex attains an excellent notched impact resistance level, e.g., about k J/m$^2$ or higher (at room temperature). The polyesters of this invention as compared with those of the state of the art have the advantage that it is possible to produce molding compositions having a high toughness level in a more economical fashion. Additionally, it is possible to utilize ungrafted copolymers having a softening temperature below room temperature, which otherwise are unusable.

The use areas for the moldings of the invention are the automotive, electrical or the electronic sector.

The parameters given in the specification and examples have been determined using the measuring methods set out below:

The viscosity number (J) of the polybutylene terephthalate was determined according to DIN 16 779, part 2, on solutions of 0.5 g of polybutylene terephthalate in 100 ml of phenol/o-dichlorobenzene (50/50 parts by weight) at 25° C.

The notched impact resistance ($a_K$) of the molding compositions was measured according to DIN 53 453 on standard small rods, molded at 250° C. and having a rectangular notch.

Determination of the glass transition temperature ($T_g$) of the elastomer took place in a torsion vibration test (DIN 53 445) with a torsion pendulum.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the preceding text and the following examples, all temperatures are set forth uncorrected in degrees Celsius and all parts and percentages are by weight, unless otherwise indicated.

The examples not in accordance with this invention are denoted by letters.

EXAMPLE 1

An aqueous latex based on a synthetic resin of styrene, butadiene and acrylic acid (styrene/butadiene/acrylic acid ratio: 27.5:70:2.5% by weight; content of functional groups: 2.2 mol-% carboxy groups; solids content: 40% by weight; glass transition temperature: $-45°$ C.) is fed in metered amounts into the second zone of a laboratory twin-screw kneader ("LEISTRITZ" 30.34) with screws rotating in the same direction, with the aid of a piston-diaphragm pump, while a commercially available homopolybutylene terephthalate (J=105 cc/g) ("VESTODUR" 1000) is introduced by way of the first zone of the kneader. Addition of the latex quantity is performed in such a way that the elastomer proportion in the finished molding composition is 20% by weight. The melt temperature is 250° C. In zones 5 and 8 of the kneader, having a length of, in total, 10 zones (33.5 D), the melt is devolatilized through evaporation of the water by the application of a vacuum. The residual water content of the melt at the discharge nozzle of the kneader is 0.1–0.15% by weight. The melt is cooled in a water bath, extruded as a rod, and dried (ejected quantity: 5 kg/h). The granulated material is subsequently subjected to a thermal aftertreatment for 24 hours at 200° C., 40 mbar, and with a nitrogen stream of 0.5 m³/h in a tumbler dryer. The granulated material is molded in a screw injection molding machine at 250° C. into small standard rods according to DIN 53 453 and tested. The values for the impact resistance (notched) can be seen from the table.

EXAMPLE 2

A polyester according to Example 1 is used and processed to obtain the molding composition. The latex employed is a polybutyl acrylate having a proportion of maleic acid monobutyl ester (butyl acrylate/maleic ester proportion: 93.3:6.7% by weight; content of functional groups: 5 mol-% ester groups and 5 mol-% carboxy groups; solids content: 35% by weight; glass transition temperature: $-43°$ C.).

Recondensation and working up of the molding composition into small standard rods take place analogously to Example 1.

EXAMPLE 3

A commercially available latex based on a synthetic resin of butadiene, acrylonitrile and methacrylic acid (butadiene/acrylonitrile/methacrylic acid ratio: 65:30.5:4.5% by weight; content of functional groups: 2.9 mol-% carboxy groups; solids content: about 45% by weight; glass transition temperature: $-23°$ C.) ("PERBUNAN" N latex VT) is processed into a molding composition in accordance with the steps described in Example 1, with the polyester set forth therein.

Recondensation and processing into small standard rods take place analogously to Example 1.

EXAMPLE 4

A latex is employed made up of 9.3% by weight of butyl acrylate, 0.7% by weight of maleic acid mono-n-butyl ester, and 90% by weight of butadiene by emulsion polymerization; this latex was produced so that butadiene was polymerized in the first stage (core), and the mixture of butyl acrylate and maleic acid mono-n-butyl ester was polymerized thereon as the second stage (shell). The core has a glass transition temperature of about $-80°$ C. and the shell has a glass transition temperature of about $-43°$ C. The shell of the latex contains 5 mol-% ester groups and 5 mol-% carboxy groups. The solids content is 28% by weight.

The latex is processed into a molding composition in accordance with the steps described in Example 1, with the polyester set forth therein. Recondensation and processing into small standard rods take place analogously to Example 1.

EXAMPLE A

The latex disclosed in Example 4 (solids content 28% by weight) is precipitated in correspondence with the operating directions in European Patent No. 56,123 and dewatered mechanically to a content of 35% by weight of water (solids content 65% by weight). During this step, the graft polymer, present as an aqueous latex, coagulates. During the attempt of processing this partially dewatered latex dispersion into a molding composition, in correspondence with the measures of Example 1, with the polyester described therein, the units utilized for metering the latex become clogged.

TABLE

| Example | Viscosity Number (J) of Polyester in Molding Composition [cc/g] | Impact Resistance (Notched) [kJ/m²] | | | |
|---|---|---|---|---|---|
| | | 23° C. | 0° C. | $-20°$ C. | $-40°$ C. |
| 1 | 115 | N.B.(*) | 27 | 20 | 12 |
| 2 | 112 | N.B.(*) | 25 | 14 | 7 |
| 3 | 105 | N.B.(*) | 17 | 9 | 3 |
| 4 | 108 | N.B.(*) | 20 | 12 | 8 |
| A | — | — | — | — | — |

(*)N.B. = No Break

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of increasing the impact strength of a molding composition comprising admixing an aqueous latex of a synthetic resin having a solids content of 35% by weight or less with a linear high-molecular weight polyester in melt form under strong shear forces effective to form the mixture, wherein said synthetic resin is a copolymer having 0.1-20 mol-% of functional groups that are able to form ester or amide linkages, said copolymer being obtained by addition polymerization of unsaturated monomers, and said composition having a latex proportion, calculated as solid matter, of 1-400 parts by weight, based on 100 parts by weight of polyester.

2. A method according to claim 1, wherein said copolymer is a block copolymer having a glass transition temperature of $\leq 0°$ C.

3. A method according to claim 1, wherein the copolymer is a polymer of the core-shell type and wherein the polymer resulting when the monomers used to form the shell are polymerized by themselves has a glass transition temperature of $\leq 0°$ C.

4. A method according to claim 3 wherein said glass transition temperature is ≦ −20° C.

5. A method according to claim 1, wherein the polyester has a viscosity number of 90–150 cc/g.

6. A method according to claim 1, wherein admixing is performed at a temperature 15°–40° C. above the melting point of the polyester.

7. A method according to claim 1, wherein said latex has a solids content of 20–30% by weight.

8. A method according to claim 1, wherein said copolymer is an ungrafted copolymer.

9. A method according to claim 1, wherein said latex has a solids content of 20–35% by weight.

10. A method according to claim 2, wherein said glass transition temperature is ≦ −20° C.

11. A method according to claim 2, wherein said copolymer has a functional group content of 0.5–15 mol-%.

12. A method according to claim 1, wherein said functional groups are carboxy, ester, amide, epoxy, amino or hydroxy groups.

13. A method according to claims 1, wherein said latex has a solids content of 30–35% by weight.

14. A method according to claim 1, wherein the polyester is polyterephthalate.

15. A method according to claim 1, wherein the polyester is a polyethylene terephthalate, polypropylene terepyhthalate or polybutylene terephthalate.

16. A method according to claim 1, wherein the polyester has a viscosity number of 50–250 cc/g.

17. A method according to claim 1, wherein the amount of said synthetic resin is 5–100% by weight based on the amount of polyester.

18. A method according to claim 1, wherein the amount of said synthetic resin is 10–40% by weight based on the amount of polyester.

19. A method according to claim 1, wherein admixing is performed at 150°–300° C.

20. A method according to claim 1, wherein admixing is performed at temperature 10°–70° C. above the melting point of the polyester.

21. A method according to claim 1, wherein admixing is performed at a pressure of 1–100 bar.

* * * * *